United States Patent
Pei et al.

(10) Patent No.: US 8,117,440 B2
(45) Date of Patent: Feb. 14, 2012

(54) METHODS AND APPARATUS FOR ENABLING UNIFIED (INTERNET PROTOCOL VERSION) IPV6/IPV4 ROUTING SERVICES OVER IPV4-ONLY INTERFACES

(75) Inventors: Guangyu Pei, Sammamish, WA (US); Phillip A. Spagnolo, Auburn, WA (US); Fred L. Temolin, North Bend, WA (US)

(73) Assignee: The Boeing Company, Chicago, IL (US)

( * ) Notice: Subject to any disclaimer, the term of this patent is extended or adjusted under 35 U.S.C. 154(b) by 777 days.

(21) Appl. No.: 12/259,727

(22) Filed: Oct. 28, 2008

(65) Prior Publication Data
US 2010/0106961 A1    Apr. 29, 2010

(51) Int. Cl.
*H04L 9/00* (2006.01)
*H04L 9/32* (2006.01)

(52) U.S. Cl. ............ 713/163; 713/151; 713/152; 726/3; 726/4; 726/5; 726/6

(58) Field of Classification Search .................... 713/153
See application file for complete search history.

(56) References Cited

U.S. PATENT DOCUMENTS

| | | | |
|---|---|---|---|
| 6,977,937 B1 | 12/2005 | Weinstein et al. | |
| 2001/0040895 A1 | 11/2001 | Templin | |
| 2006/0215657 A1 | 9/2006 | Lee et al. | |
| 2009/0113201 A1* | 4/2009 | Mackey et al. | 713/151 |

OTHER PUBLICATIONS

Templin, F. et al.; Intra-Site Automatic Tunnel Addressing Protocol (ISATAP); RFC 5214.
Hasan, M.S et al.; Designing Software Designed Small Form Fit Radios for JTRS Networking; In Proceedings of Milcom 2006.
Ogier, R. et al.; MANET Extension of OSPF using CDS Flooding; work in progress; IETF Internet Draft.
Mirtorabi, S. et al; Support of Address Families in OSPFv3; work in progress; IETF Internet Draft.

\* cited by examiner

*Primary Examiner* — Longbit Chai
(74) *Attorney, Agent, or Firm* — Armstrong Teasdale LLP (57) ABSTRACT

Some embodiments of the present invention provide an apparatus that provides routing services between a red network and a black network. The apparatus includes a red router within the red network, a black router within the black network, and an IP encryptor having a red side IPv4-only interface and a black side interface, with the red side interface operatively coupled to the red router and the black side interface operatively coupled to the black network. The apparatus is configured to provide unified IPv6/IPv4 OSPFv3 routing over IPv4-only interfaces using cross-layer extensions.

18 Claims, 6 Drawing Sheets

METHODS AND APPARATUS FOR ENABLING UNIFIED (INTERNET PROTOCOL VERSION) IPV6/IPV4 ROUTING SERVICES OVER IPV4-ONLY INTERFACES

BACKGROUND

This disclosure relates generally to network routing protocols, and more particularly to methods and apparatus for providing a unified Internet Protocol version 6 (IPv6) and Internet Protocol version 4 (IPv4) routing service over IPv4-only interfaces, including secure networks in a mobile wireless ad hoc network (MANET) environment.

Known High Assurance Internet Protocol Encryptor (HAIPE) devices that provide communications security (COMSEC) between black networks and red networks provide either IPv4-within-IPv4 or IPv6-within-IPv6 encapsulation for data packets; they do not provide either IPv6-within-IPv4 or IPv4-within-IPv6 encapsulation. As a result, a routing protocol (e.g., open shortest path first version 3 or "OSPFv3") can not send its IPv6 control packets to peers over the IPv4 black network. Furthermore, if OSPFv3 is configured to run address family extensions for the IPv4 red network, it can not send or receive route control messages over an IPv4-only encryptor tunneling interface.

An Internet engineering task force (IETF) Internet protocol security (IPsec) specified in request for comment (RFC) 4301 allows independent Internet protocol (IP) versions for inner and outer headers that do not require the Intra-Site Automatic Tunnel Addressing Protocol (ISATAP) interface specified in RFC 5214. The Department of Defense (DoD) HAIPE specification is derived from IPsec. The capability of HAIPE devices being deployed vary based on their released date. Early versions of these devices support IPv4-within-IPv4 encapsulation only. Recent HAIPE specifications support IPv6-within-IPv6 encapsulation, however the specifications do not support mixed IP versions for the inner and outer header.

An OSPF extension to the OSPF broadcast interface for mobile ad hoc networks is disclosed in U.S. Pat. No. 6,977,937. This extension uses underlying mobile intranet routing to handle mobility and to provide stable abstraction. However, this reference does not disclose how to run red OSPF over black OSPF. Furthermore, it does not disclose how to run a red IPv6 routing protocol over black IPv4 networks.

A MANET extension of OSPF using connected dominating set (CDS) Flooding has been proposed by IETF. The MANET proposal extends the IPv6 routing protocol OSPFv3 and adds a new MANET interface. The IETF has also proposed address family extensions of OSPFv3 such that OSPFv3 can support IPv4 networks. However, these extensions rely on link local IPv6 addressing to exchange route control messages over dual-use IPv6/IPv4 interfaces. On interfaces that support both IPv4 and IPv6 natively, the proposed OSPFv3 address family extension can function properly with no modifications, i.e., OSPFv3 can send control messages and install both IPv6 and IPv4 routes on the same dual-use IPv6/IPv4 interface. The OSPFv3 address family extension allows an IPv6 routing protocol to install routes for IPv4 data networks. However, the proposed OSPFv3 family extension assumes that each IPv4 interface has an IPv6 link local address (i.e., the interface supports both IPv4 and IPv6 natively) and neighboring OSPFv3 nodes can exchange control packets over the link. This assumption is not valid for IPv4-only interfaces such as the interface provided by an IPv4-only HAIPE encryptor. As a result, OSPFv3 address family extensions cannot run directly over IPv4-only interfaces.

IETF OSPFv3 address family extension enables OSPFv3 to support both IPv4 and IPv6 data networks. A tunneling method is used to allow IPv6 nodes to exchange packets over IPv4 networks. In the case of the red/black architecture, IPsec (RFC 4301) allows IPv6 over IPv4. However, various versions of DoD HAIPE devices do not allow such operation.

DoD HAIPE 1.3.5 supports only IPv4 as both the inner and outer layers. DoD HAIPE 3.1 supports both IPv6-only as inner and outer layers, and IPv4-only as inner and outer layers.

U.S. patent application Ser. No. 20060215657 discloses the use of an ISATAP interface across network address translation (NAT). The patent does not disclose operation over IPv4-only interfaces within the same routing region, and in particular assumes no IP encryptors along the path (i.e., the path is either all black or all red).

OSPFv3 and ISATAP interface implementations are widely deployed in operational networks. In particular, an ISATAP interface is a Non-Broadcast, Multiple Access (NBMA) interface and as such is a standard interface type accepted by OSPFv3. In common practice, ISATAP interfaces are configured over underlying IPv4 MANET interfaces, with the ISATAP interface supporting IPv6 operations only and not IPv4 operations. Therefore, this existing art teaches only the installation via OSPFv3 of IPv6 routes on an ISATAP interface, i.e., it does not teach a method for supporting unified IPv6/IPv4 routing services over IPv4-only interfaces.

BRIEF DESCRIPTION

In one aspect, some embodiments provide an apparatus that provides routing services between a red network and a black network. The apparatus includes a red router within the red network, a black router within the black network, and an IP encryptor having a red side IPv4-only interface and a black side interface, with the red side interface operatively coupled to the red router and the black side interface operatively coupled to the black network. The apparatus is configured to provide OSPF routing services.

In another aspect, some embodiments provide a communication system that includes a tactical operation center having a red internal IP network and a red router, a mobile ad-hoc black network having a black router, and an IP encryptor having a red side IPv4-only interface and a black side interface. The red side interface is operatively coupled to the red router and the black side interface operatively coupled to the black network, and the communication system is configured to provide OSPF routing services.

In yet another aspect, some embodiments provide a method to provide OSPF routing services in a communication system. The communication system includes a red router within the red network, a black router within the black network, and an IP encryptor having a red side IPv4-only interface and a black side interface. The red side interface is operatively coupled to the red router and the black side interface is operatively coupled to the black network. The method includes the red network querying the IP encryptor for address mapping between black network addresses contained in topology reports and red network addresses. The method further includes setting an interface index, router ID and IPv6 link local address using router link state advertisements and intra-prefix link state advertisements.

Thus, it will be appreciated that various embodiments provide ISATAP tunneling. Some embodiments enable a unified IPv6/IPv4 OSPFv3 routing capability over IPv4-only interfaces in various combinations of IPv6 and IPv4 networks running black and red security levels and various types of encryptors. More particularly, the red side network operator does not need to maintain two versions of the OSPF protocol for different version of IP networks, namely, OSPFv2 and OSPFv3. Also, some embodiments provide the capability of computing routes for both IPv4 and IPv6 on red side networks over black IP routers. Moreover, some embodiments provide unified IPv6/IPv4 OSPFv3 routing over IPv4-only interfaces as supported by cross-layer extensions.

The foregoing summary, as well as the following detailed description of certain embodiments, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION

As used herein, an element or step recited in the singular and proceeded with the word "a" or "an" should be understood as not excluding plural said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Technical effects of the present disclosure include the enabling of a unified IPv6/IPv4 OSPFv3 routing capability over IPv4-only interfaces in any combination of IPv6 and IPv4 networks running black and red security levels and any type of deployed encryptor. Another technical effect of the present disclosure is to allow a unified control plane protocol, e.g., an OSPFv3 routing protocol, to compute routes for both IPv4 and IPv6 on red side networks over black IP routers. More particularly, the red side network operator does not need to maintain two versions of the OSPF protocol for different version of IP networks, namely, OSPFv2 and OSPFv3.

Some embodiments provide an extension of the ISATAP interface model such that the underlying IPv4-only interfaces (for example, the MANET interfaces of an IP encryptor) are exposed to OSPFv3 via cross-layer information sharing for the purpose of installing IPv4 routes. In this manner, an IPv6 encapsulation of IPv4 red network routing information is enabled over the IPv4 black core.

Figure 1:
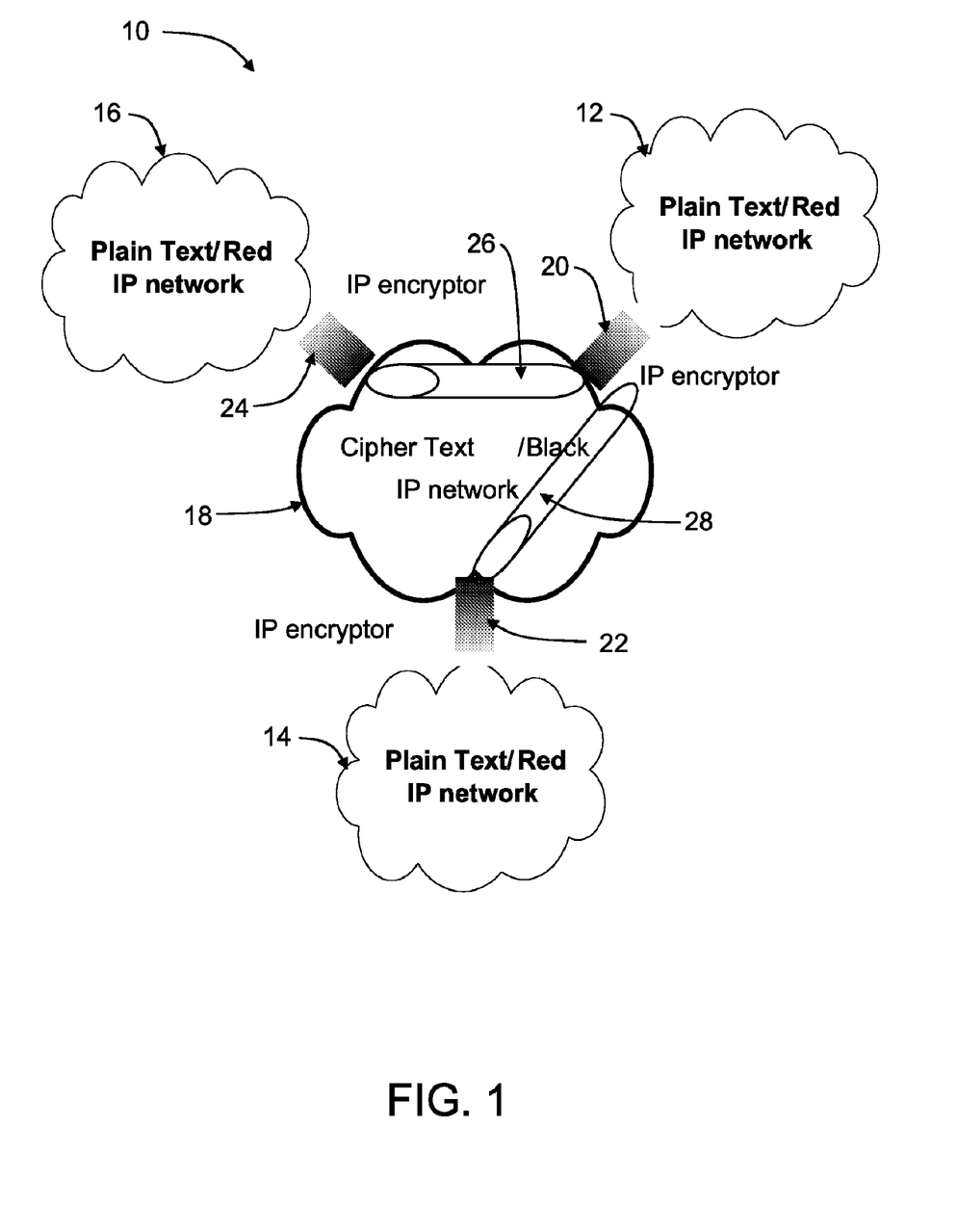
FIG. 1 is a pictorial block diagram of a red (plain text) network over a black (cipher text) network in which the red network is operatively attached to the black network through IP encryptors.

FIG. 1 is illustrative of an embodiment 10 of the present disclosure utilizing a red network 12, 14, 16 over a black network 18 architecture. Red networks 12, 14, 16 connect to one another by tunneling across one or more black networks 18 through IP encryptors 20, 22, and 24, respectively, utilizing one or more black mobile ad hoc networks 26, 28. Internet protocol (IP) versions used in red networks 12, 14, 16 and black network(s) 18 can be independent. However, the black mobile ad hoc network(s) 26, 28 is/are IPv4 as a result of wireless bandwidth limitations. Red network(s) 12, 14, 16 is/are IPv6 and can also include legacy IPv4 red networks. Red network(s) 12, 14, 16 can be internal IP networks of a tactical operation center or vehicles that can heavily leverage commercial off-the-shelf (COTS) products. In different embodiments, the capabilities of encryptors 20, 22, 24 vary. Some encryptors 20, 22, 24 may have IPv4 capability only, others may have IPv4/IPv4 and IPv6/IPv6 capabilities, and some may follow the IPsec specification. Some embodiments 10 of the present disclosure have one or more encryptors 20, 22, 24 that can handle all of these cases.

Figure 2:
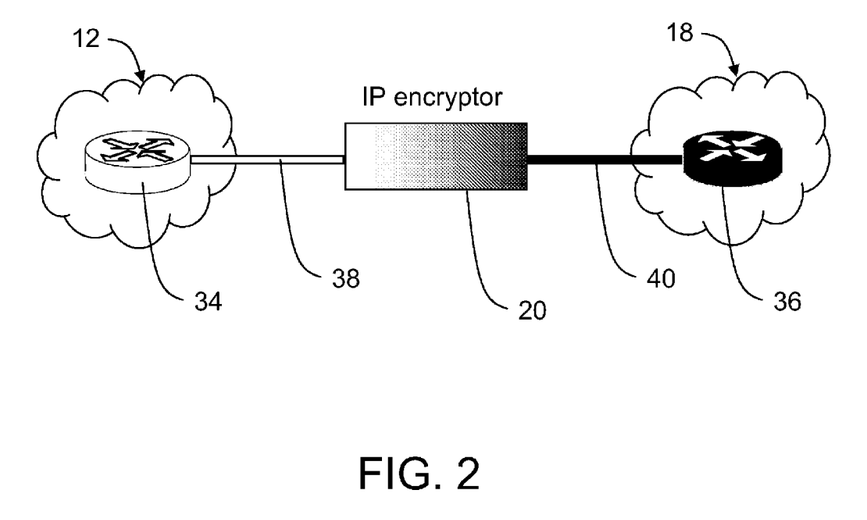
FIG. 2 is a pictorial block diagram showing an IP encryptor operatively connected between a red router within a red network 12 and a black router within a black network.

In some embodiments of the present disclosure and referring to FIG. 2, an IP encryptor 20 (or 22 or 24) is operatively connected between a red router 34 within a red network 12 (or 14 or 16) and a black router 36 within a black network 18. A red side IPv4-only interface 38 connects to IP encryptor 20, as does a black side interface 40. Since interface 38 is used to tunnel red IP packets over black network 18, configurations of the present disclosure use routing protocols configured to calculate routes correctly using interface 38.

Figure 3:
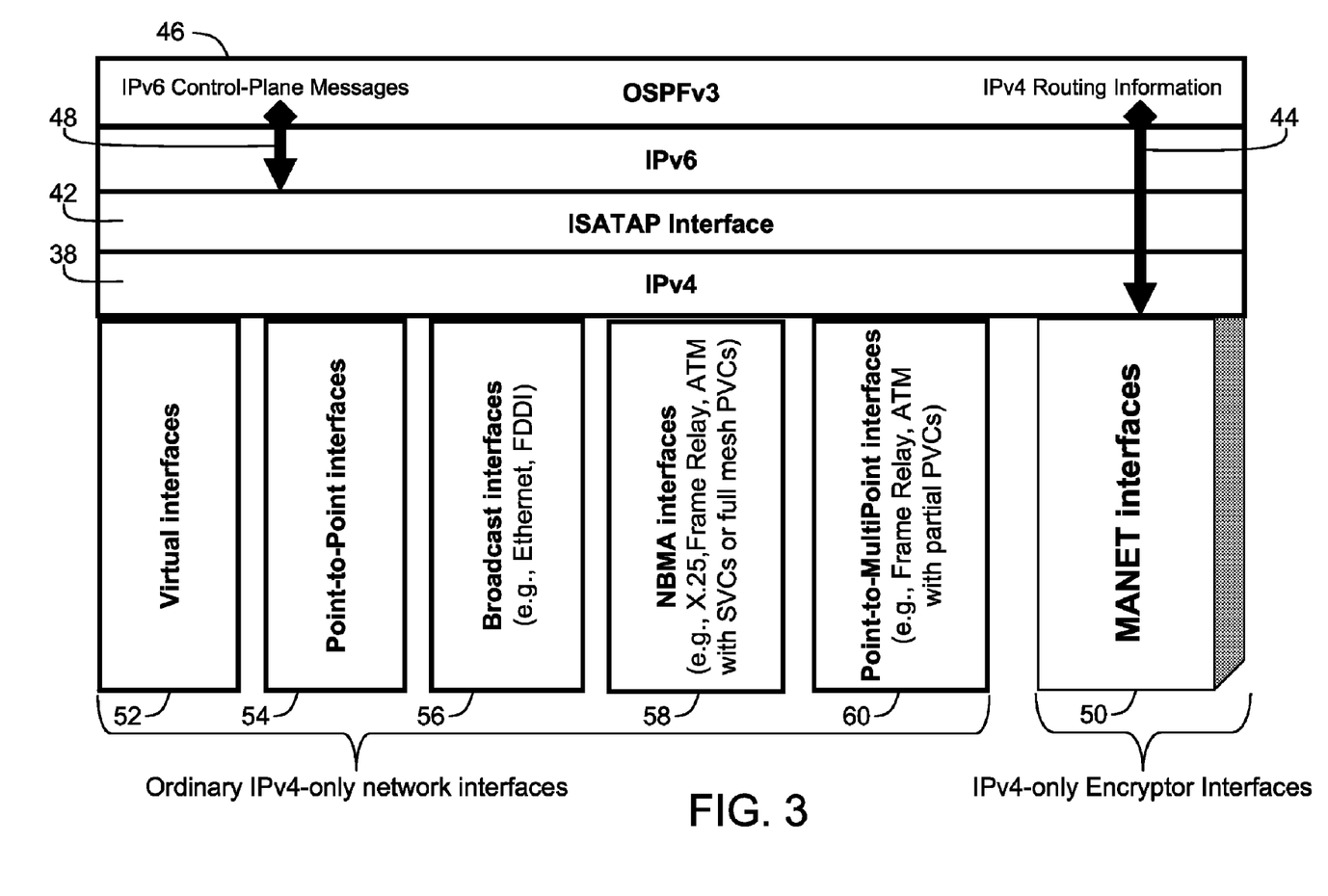
FIG. 3 is a pictorial block diagram of an ISATAP interface associated with an IP encryptor interface that is configured to run OSPFv3 MANET in a manner in which OSPFv3 "sees" the two interfaces in a "unified" fashion.

In some embodiments of the present disclosure and referring to FIG. 3, unified address family extensions for OSPFv3 are supported. Although a MANET interface extension for OSPFv3 has been developed by the IETF, the configuration developed by the IETF assumes a native IPv6 capability that can not be supported when the interface to the IP encryptor is IPv4-only. Thus, some embodiments of the present disclosure configure an ISATAP interface 42 over an IPv4 layer 38, and employ cross-layer extensions 44 over the ISATAP interface 42 that enable OSPFv3 46 to send/receive control packets 48 over ISATAP interface 42 while installing IPv4 routes 44 on IPv4-only interfaces 50 (such as a MANET interface 50 associated with IPv4-only encryptors). Ordinary IPv4-only interfaces 52, 54, 56, 58, 60, etc. may also be operatively associated with an ISATAP interface 42.

Figure 4:
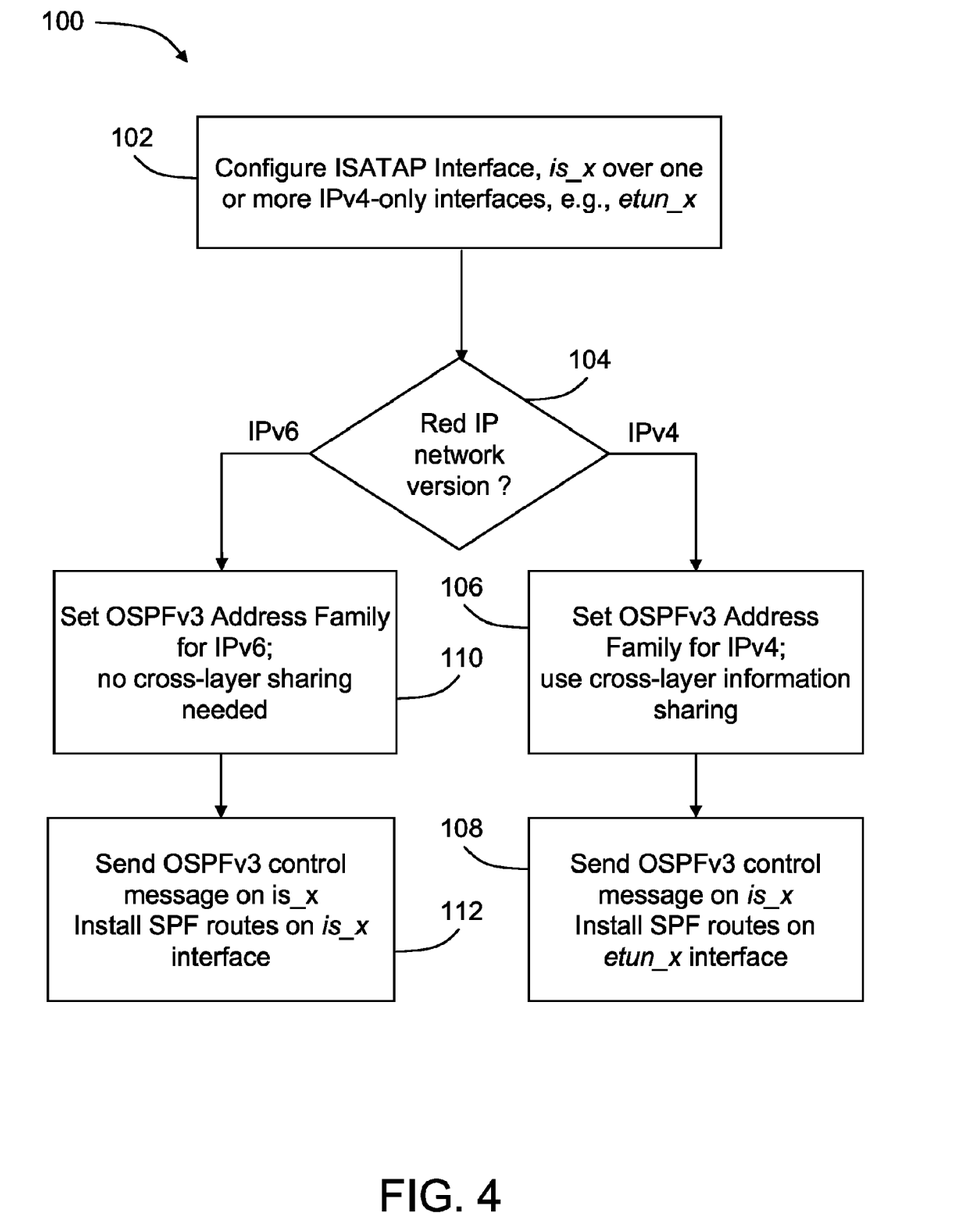
FIG. 4 is a flow chart of an embodiment of an ISATAP interface used in some embodiments of the present disclosure.

In some embodiments of the present disclosure and referring to flow chart 100 of FIG. 4, ISATAP interface support is provided for unified IPv6/IPv4 OSPFv3 routing. At 102, ISATAP interface support is_x is configured over one or more IPv4-only interfaces etun_x that belong to the same OSPFv3 routing region (for example, multiple MANET interfaces 50 of IPv4-only encryptors 20 that belong to the same MANET). The IPv4 address of an underlying IPv4 interface (e.g., a MANET interface correcting to the encryptor) is used to form an ISATAP link-local address of the ISATAP interface 42. At 104, the IP version of the underlying red network (12, 14, or 16) is determined. If the data plane of the underlying red network 12, 14, or 16 is IPv4, OSPFv3 is configured to run the address family extension for IPv4 networks and cross-layer extensions 44 are configured to be used at 106 for installing IPv4 routes on etun_x interfaces. OSPFv3 control messages 48 are then sent on ISATAP interface is_x at 108, while Shortest Path First (SPF) routes are installed on the etun_x interfaces. Otherwise, if the red network 12, 14, or 16 has an IPv6 data plane, OSPFv3 is configured at 110 to install IPv6 routes on the ISATAP interface without cross-layer sharing, and at 112, OSPFv3 control messages 48 are sent on is_x and SPF routes are installed on the is_x interface. All control traffic and user data traffic is tunneled over the underlying IPv4 interface, e.g, the MANET interface 50 of an IPv4 encryptor 20. Embodiments of the present disclosure provide not just the left branch 110, 112, but also the right branch 106, 108 of flow chart 100. As a result, a unified IPv6/IPv4 OSPFv3 routing protocol can be used to handle any combination of IP versions and, in embodiments using black networks and red networks using IP encryptors, configurations of the present disclosure enable operation over all existing instances (i.e., IPsec, HAIPE 1.3.5 or HAIPE 3.1).

Figure 5:
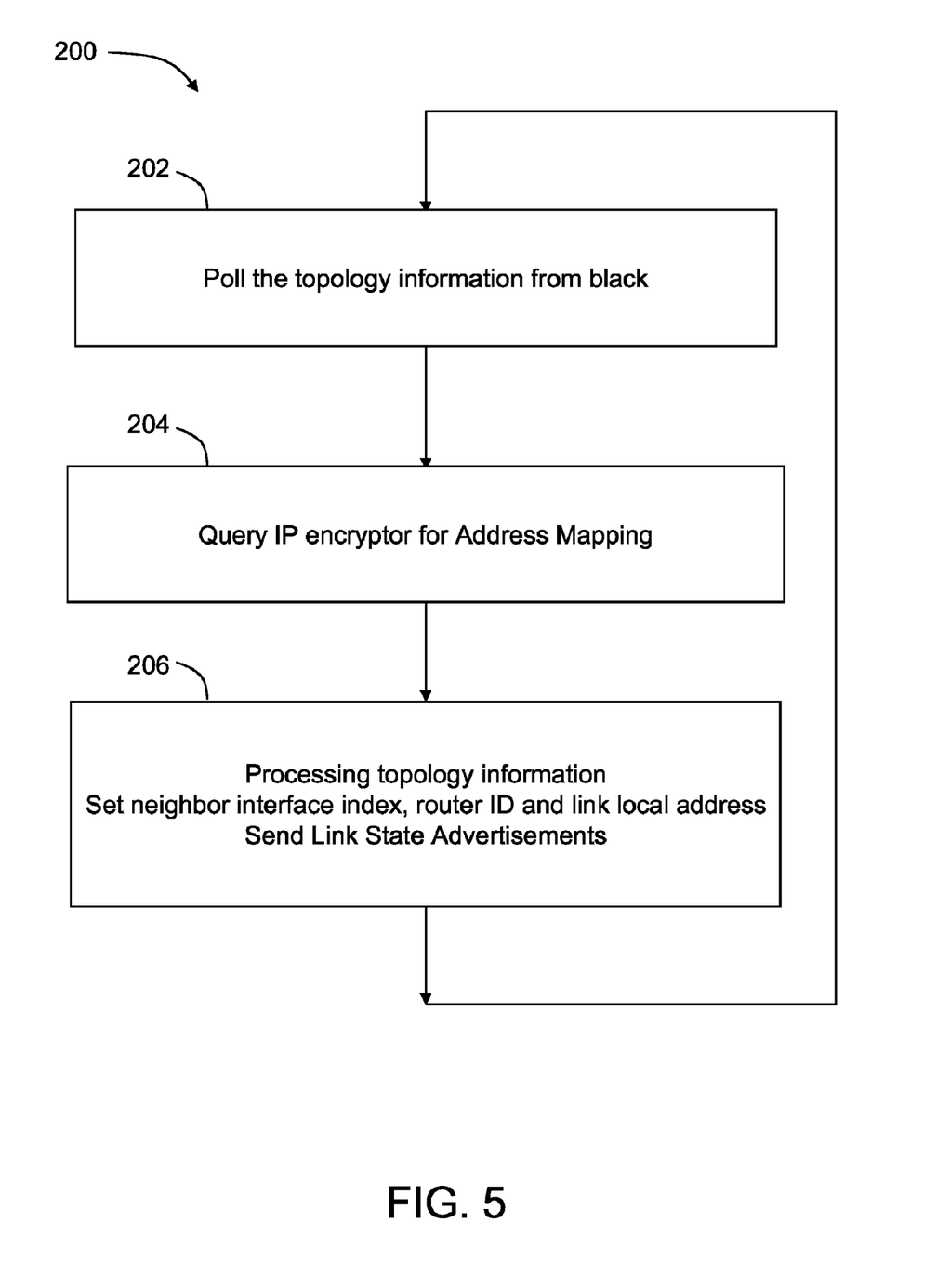
FIG. 5 is flow chart showing a process (e.g., a software module) in which red network side OSPFv3 processing topology information is received from a black network side together with one or more additional IPv6 and/or encryptor-related processes.

In some embodiments of the present disclosure and referring to flow chart 200 of FIG. 5, red network side OSPFv3 processing topology information is received from the black network side at 202, as is known in the prior art. However, embodiments of the present disclosure also provide one or more additional IPv6 and/or encryptor-related processes. For example, in some embodiments, a process or software module 204 is provided to allow the red network 12 side to query the IP encryptor 20 for address mapping between black network 18 addresses contained in topology reports and red network 12 addresses. Additionally, because topology reporting usually does not contain red network side information such as a peer's interface index, router ID and IPv6 link local address, another process 206 is provided in some configurations to set this information correctly. Most of the necessary information is found in router link state advertisements and intra-prefix link state advertisements.

Figure 6:
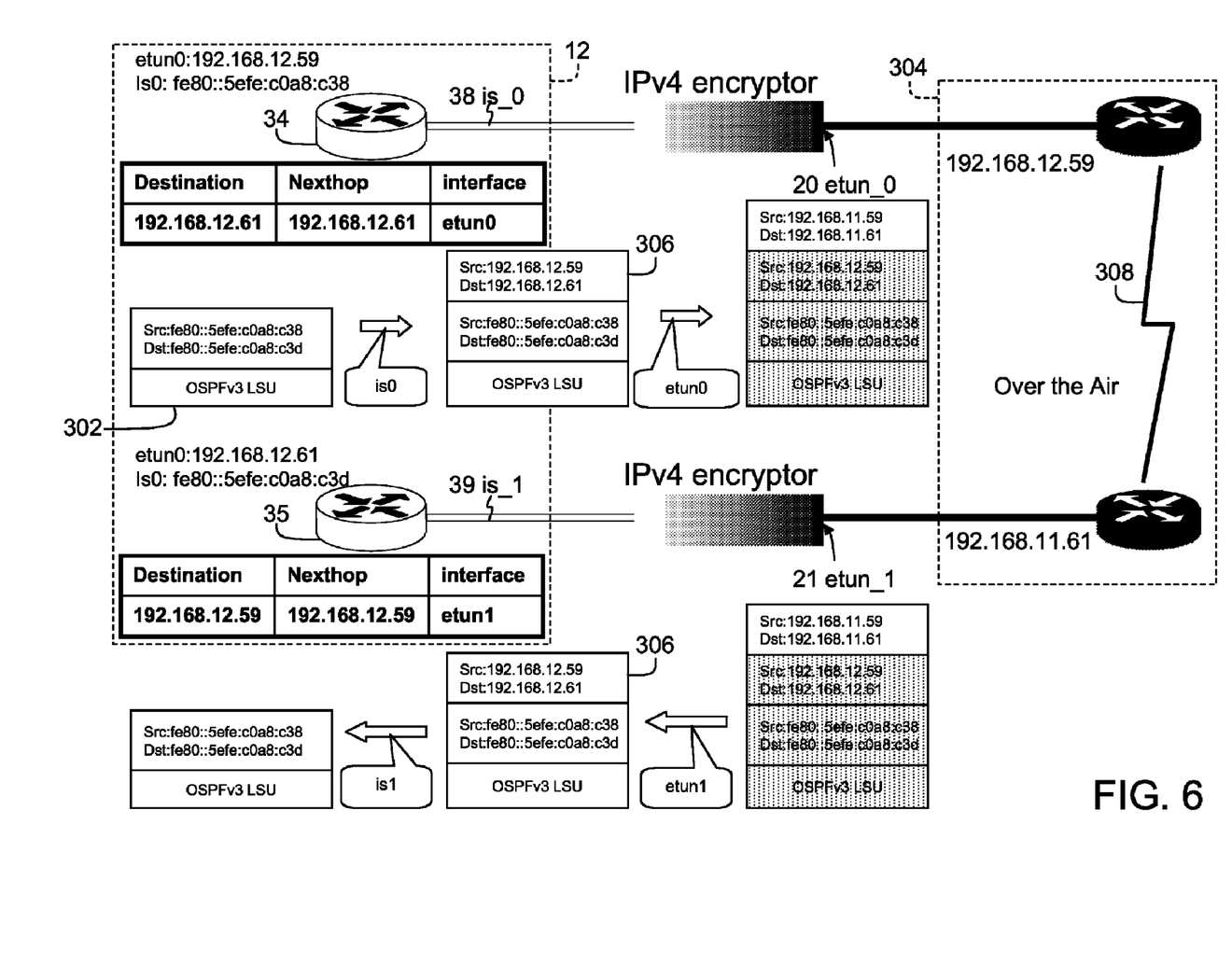
FIG. 6 is a pictorial data flow diagram showing how an OSPFv3 control packet (e.g., Link State Update or "LSU") traverses an IPv4 encryptor using an ISATAP interface (is__0 and is__1), and illustrating that the IPv4 routing tables are installed by OSPFv3 and that the next hop interface is an IPv4 interface (etun__0 and etun—1).

In some embodiments of the present disclosure and referring to the pictorial block diagram of FIG. 6, an OSPFv3 control packet 302 (e.g., Link State Update or "LSU") traverses an IPv4 encryptor 20 and is forwarded over a black network 304. OSPFv3 installs an IPv4 routing table 306, and the next hop interface is an IPv4 interface (e.g., etun_0 or etun_1). In the example shown in FIG. 6, two red IP network nodes 34, 35 are connected via black network wireless links 308. In red network 12, the IP encryptor interfaces etun_0 (20) and etun_1 (21) are configured as MANET interfaces and OSPFv3 runs with an instance ID of IPv4 Unicast Address Family. The ISATAP interfaces are automatically created based on IP encryptor interfaces, e.g., is_0 (38) or is_1 (39). After an IPv4 encryptor receives an encapsulated IPv4 packet, it performs normal address mapping and encryption. Example source addresses and destination addresses are shown in FIG. 6 to illustrate the various address mapping and encapsulation options.

Thus, it will be appreciated that various embodiments of the present disclosure provide ISATAP tunneling. Some embodiments enable a unified IPv6/IPv4 OSPFv3 routing capability over IPv4-only interfaces in various combinations of IPv6 and IPv4 networks running black and red security levels and various types of encryptors. More particularly, the red side network operator does not need to maintain two versions of the OSPF protocol for different version of IP networks, namely, OSPFv2 and OSPFv3. Also, some embodiments of the present disclosure provide the capability of computing routes for both IPv4 and IPv6 on red side networks over black IP routers.

This written description uses examples to disclose the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for providing routing services between a red network and a black network, the apparatus comprising:
    a red router within the red network;
    a black router within the black network; and
    an IP encryptor having a red side internet protocol version 4 (IPv4)-only interface and a black side interface, the red side interface operatively coupled to the red router and the black side interface operatively coupled to the black network;
    said apparatus configured to provide unified internet protocol version 6 (IPv6)/IPv4 open shortest path first version 3 (OSPFv3) routing over IPv4-only interfaces by:
        allowing the red network to query the IP encryptor for address mapping between black network addresses and red network addresses; and
        setting an interface index, a router ID, and an IPv6 link local address using router link state advertisements and intra-prefix link state advertisements.

2. An apparatus in accordance with claim 1 wherein to provide unified IPv6/IPv4 OSPFv3 routing over IPv4-only interfaces, said apparatus provides an Intra-Site Automatic Tunnel Addressing Protocol (ISATAP) interface configured over one or more IPv4-only interfaces etun_x that belong to a single OSPFv3 routing region.

3. An apparatus in accordance with claim 2 further configured to utilize an IPv4 address of an IPv4 interface to form an ISATAP link-local address of the ISATAP interface.

4. An apparatus in accordance with claim 3 further configured to:
    determine an IP version of a red network, and
    if the red network is IPv4, configure OSPFv3 to run an address family extension for IPv4 networks, configure cross-layer extensions for installing IPv4 routes on IPv4-only interfaces etun_x, and to send an OSPFv3 control message to install SPF routes; otherwise,
    if the red network is IPv6, configure OSPFv3 to install IPv6 routes on the ISATAP interface without cross-layer sharing, send an OSPFv3 message, and install SPF routes; and tunnel control traffic and user data traffic over an underlying IPv4 interface.

5. An apparatus in accordance with claim 1 wherein said apparatus is configured to allow the red network to query the IP encryptor for address mapping between black network addresses contained in topology reports and red network addresses.

6. An apparatus in accordance with claim 1 wherein the black network is a mobile wireless ad hoc network.

7. An apparatus in accordance with claim 1 wherein the red network is an internal IP network of a tactical operation center.

8. An apparatus in accordance with claim 7 wherein the black network is a mobile ad-hoc black network.

9. A communication system comprising:
  a tactical operation center comprising a red internal internet protocol (IP) network and a red router;
  a mobile ad-hoc black network having a black router; and
  an IP encryptor having a red side IP version 4 (IPv4)-only interface and a black side interface, the red side interface operatively coupled to the red router and the black side interface operatively coupled to the black network;
  said communication system configured to provide unified IP version 6 (IPv6)/IPv4 open shortest path first version 3 (OSPFv3) routing over IPv4-only interfaces by:
    allowing the red network to query the IP encryptor for address mapping between black network addresses and red network addresses; and
    setting an interface index, a router ID, and an IPv6 link local address using router link state advertisements and intra-prefix link state advertisements.

10. A communication system in accordance with claim 9 wherein said communication system is configured to allow the red network to query the IP encryptor for address mapping between black network addresses contained in topology reports and red network addresses.

11. A communication system in accordance with claim 9 wherein to provide unified IPv6/IPv4 OSPFv3 routing, said communication system provides an Intra-Site Automatic Tunnel Addressing Protocol (ISATAP) interface configured over one or more IPv4-only interfaces etun_x that belong to a single OSPFv3 routing region.

12. A communication system in accordance with claim 11 further configured to utilize an IPv4 address of an IPv4 interface to form an ISATAP link-local address of the ISATAP.

13. A communication system in accordance with claim 12 further configured to:
  determine an IP version of a red network ISATAP interface, and
  if the red network is IPv4, configure OSPFv3 to run an address family extension for IPv4 networks, configure cross-layer extensions for installing IPv4 routes, and to send an OSPFv3 control message to install SPF routes; otherwise,
  if the red network is IPv6, configure OSPFv3 to install IPv6 routes on the ISATAP interface without cross-layer sharing, send an OSPFv3 message, and install SPF routes; and
  tunnel control traffic and user data traffic over an underlying IPv4 interface.

14. A method for providing unified internet protocol version 6/internet protocol version 4 (IPv6/IPv4) open shortest path first version 3 (OSPFv3) routing in a communication system that includes a red router within a red network and a black router within a black network, said method comprising:
  configuring an IP encryptor having a red side IPv4-only interface and a black side interface, the red side interface operatively coupled to the red router and the black side interface operatively coupled to the black network; and
  configuring at least one processor to perform the functions of:
    querying the IP encryptor from the red network for address mapping between black network addresses contained in topology reports and red network addresses;
    setting red network information including an interface index, a router ID and an IPv6 link local address using router link state advertisements and intra-prefix link state advertisements; and
    providing unified IPv6/Pv4 OSPFv3 routing using the address mapping and the red network information.

15. A method in accordance with claim 14 wherein the black network is a mobile wireless ad hoc network.

16. A method in accordance with claim 14 further comprising providing an Intra-Site Automatic Tunnel Addressing Protocol (ISATAP) interface configured over one or more IPv4-only interfaces etun_x that belong to a single OSPFv3 routing region.

17. A method in accordance with claim 16 further comprising utilizing an IPv4 address of an IPv4 interface to form an ISATAP link-local address of the ISATAP.

18. A method in accordance with claim 17 further comprising:
  determining an IP version of a red network, and
  if the red network is IPv4, configuring OSPFv3 to run an address family extension for IPv4 networks, configuring cross-layer extensions for installing IPv4 routes, and sending an OSPFv3 control message to install SPF routes; otherwise,
  if the red network is IPv6, configuring OSPFv3 to install IPv6 routes on the ISATAP interface without cross-layer sharing, sending an OSPFv3 message, and installing SPF routes; and
  tunneling control traffic and user data traffic over an underlying IPv4 interface.

* * * * *